UNITED STATES PATENT OFFICE 2,265,156

ACTIVATED INSECTICIDE COMPOSITION

Robert J. Geary, Blue Point, N. Y., assignor to The Dow Chemical Company, Midland, Mich., a corporation of Michigan No Drawing. Application September 11, 1940, Serial No. 356,352

13 Claims. (Cl. 167—24)

This invention relates to insecticides and is particularly concerned with activated compositions comprising rotenone and a dibenzyl-disulphide compound.

A specific problem in parasite control which is not met by the use of rotenone alone is that of killing red spiders and their eggs in greenhouse work. Roses and other plants commonly raised under glass frequently become so heavily infested with red spiders and related mite and insect pests as seriously to reduce the yield of marketable blooms. Such conditions require immediate and effective treatment if substantial plant injury is to be avoided. This problem is further complicated by the tender nature of the vegetative growth affected, whereby many toxicants ordinarily suitable for insect and spider control cannot be used without materially injuring the plant.

Where rotenone sprays are employed on spider-infested vegetation, there appears to be a definite limit in the percentage control obtainable. Increasing the amount of the toxicant employed does not increase materially the mortality of the pests. This is probably due to the fact that rotenone and derris resins are transitory in their effect and are not good ovicides, so that there is no control of reinfestation caused by the hatching of existing eggs. Repeated sprays, therefore, are required with a resultant increased cost of pest control. Furthermore, since the rotenone and derris resin sprays frequently contain an oily material as a carrier, such repeated plant treatments result in cumulative oil injury.

Among the objects of the present invention is to provide an activator for rotenone and rotenone-containing derris-type resins. A further object is to provide improved compositions for exterminating common agricultural parasites and household insect pests, which will be more quickly and more permanently toxic to insects than many compositions at present employed. An additional object is to provide an insecticide composition comprising rotenone or rotenone-containing derris-type resins as an active toxicant which will kill a percentage of insects approaching the knockdown or moribund control initially obtained upon application of the composition. A still further object is to provide an addition agent for rotenone and rotenone-containing derris-type resins which will be readily and economically synthesizable in any desired amount, and which will not be characterized by the irirtating properties, and toxicity to humans with which many other synthetic toxicants have heretofore been identified. Other objects of the invention will become apparent from the following description and examples.

According to the present invention dibenzyl-disulphide and homologs and analogs thereof are employed to activate rotenone and related plant extract toxicants and particularly rotenone-containing derris-type resins. In the presence of dibenzyl-disulphide and related compounds the ovicidal and insecticidal activity of rotenone is greatly increased so that compositions comprising the activated toxicant have a wider range of utility than is characteristic of pest control materials in which rotenone alone is employed. This increase in effectiveness is in excess of what might be predicted from a knowledge of the individual toxicities of the materials concerned and makes practical the use of reduced amounts of rotenone and rotenone-containing derris-type resins in spray and dust compositions. The combination of toxicants and activator does not have an objectionable odor and is substantially non-toxic to humans and higher animals. The mixture has little or no effect upon foliage in the amounts required to control most insect pests.

In carrying out the invention rotenone or rotenone-containing derris-type resins are mixed with the dibenzyl-disulphide to form a concentrate. To facilitate the preparation of the concentrate and to increase its utility and compatibility with various diluents, a suitable non-corrosive organic solvent may be employed therewith. The exact ingredients and amounts thereof employed are dependent upon the manner in which the concentrate is to be subsequently utilized for pest control. Generally about 1 part by weight of rotenone or an equivalent amount of an extract of derris, cubé, barbasco, craca, timbo, or other product comprising rotenone or the finely divided plant material itself is employed with from about 1 to about 16 parts by weight of the dibenzyl-disulphide or dibenzyl-disulphide derivative. A preferred composition comprises 1 part of pure rotenone or its equivalent in combination with from 2 to 5 parts of the activator. Such mixture may be employed as a concentrate or modified with various carriers, diluents, solubilizing agents, dispersing or wetting agents to produce a mixture comprising relatively high percentages of rotenone and activator and adapted to be subsequently incorporated in small amounts into insecticide dust or spray compositions.

The phrase "non-corrosive organic solvent," as herein employed, refers to any organic solvent material nonreactive with the toxicants herein described and noninjurious to the skin and general health of humans. Representative of such solvents are petroleum distillates, animal or vegetable oils, ethylene chloride, methyl-ethyl ketone, hydrogenated naphthalene, dichloro-diethyl ether, and methyl, ethyl, propyl, and butyl alcohols. A preferred group of solvents consists of those materials which are capable of dissolving the toxicant mixtures to which the present invention is directed.

In the control of agricultural insect pests the mixed toxicants with which the present invention is concerned may be employed as constituents of either spray or dust compositions. For example, the mixture may be employed in oil emulsions either dissolved in the oil or dispersed in the aqueous phase. The mixture may also be employed in water suspension in the presence of a suitable wetting agent or dispersing agent. In a further adaptation the toxicant mixture may be absorbed in or adsorbed on finely divided carriers such as diatomaceous earth, bentonite, talc, wood flour, and the like to obtain compositions adapted to be employed as dusts or to be dispersed in spray mixtures. Similarly the mixture may be incorporated in other standard type insecticidal compositions either as the sole toxic ingredient of such composition or in combination with common insecticidal materials.

The compounds with which the present invention is particularly concerned as activators for rotenone and rotenone-containing plant extracts include dibenzyl-disulphide, and the aryl, alkyl, alkoxy, cycloalkyl, chloro, and bromo nuclearly substituted derivatives thereof. Representative of such compounds are 4.4'-dichloro-dibenzyl-disulphide, 4.4' - dibromo - dibenzyl - disulphide 2.2'-dimethyl-dibenzyl-disulphide, 4.4'-dimethyl-dibenzyl-disulphide, 4,4'-ditertiary-butyl-dibenzyl-disulphide, 2.2'-diphenyl-dibenzyl-disulphide, 4:4' - dicyclohexyl-dibenzyl - disulphide, 4.4' - dimethoxy-dibenzyl-disulphide, and the like.

The following examples set forth certain embodiments of the invention but are not to be construed as limiting the same.

EXAMPLE 1

A toxicant mixture was prepared by mixing 62.5 parts by weight of derris resins (comprising 35 per cent by weight of rotenone) with 37.5 parts by weight of dibenzyl-disulphide. A portion of this product was compounded with an oil mixture consisting of equal parts by weight of coconut oil and rape seed oil to form a concentrate which was thereafter employed in the preparation of a dilute aqueous spray and applied to greenhouse plants for the control of red spiders and their eggs. Simultaneous determinations were made with compositions in which various constituents of the concentrate were omitted in order to establish the function of dibenzyl-disulphide and rotenone in the mixture. Beta-(4-tertiarybutyl-phenoxy)-ethanol was included in each concentrate as a solubilizing agent for the derris. A dispersing, spreading, and emulsifying agent consisting of the reaction product of mannitol and coconut oil and comprising a substantial proportion of a complex lauric acid ester product of reaction was used in each concentrate to aid in obtaining a relatively stable oil-in-water emulsion upon dilution. The following concentrates were employed:

Composition A

|  | Grams |
|---|---|
| Coconut oil | 52.5 |
| Rape seed oil | 52.5 |
| Solubilizing agent | 20 |
| Dispersing and wetting agent | 36 |
| Water | 16.5 |
|  | 177.5 |

Composition B

|  | Grams |
|---|---|
| Coconut oil | 52.5 |
| Rape seed oil | 52.5 |
| Solubilizing agent | 20 |
| Dispersing and wetting agent | 36 |
| Derris resins | 7.5 |
| Water | 9 |
|  | 177.5 |

Composition C

|  | Grams |
|---|---|
| Coconut oil | 52.5 |
| Rape seed oil | 52.5 |
| Solubilizing agent | 20 |
| Dispersing and wetting agent | 36 |
| Dibenzyl-disulphide | 4.5 |
| Water | 12 |
|  | 177.5 |

Composition D

|  | Grams |
|---|---|
| Coconut oil | 52.5 |
| Rape seed oil | 52.5 |
| Solubilizing agent | 20 |
| Dispersing and wetting agent | 36 |
| Derris resins | 7.5 |
| Dibenzyl-disulphide | 4.5 |
| Water | 4.5 |
|  | 177.5 |

Each composition applied to the spider infested plants was prepared by dispersing 1 part by weight of one of the concentrates in 1000 parts of water. The plants employed in the determinations were roses. The values given for the percentage control obtained with each spray composition represent the average of result for a series of nine determinations.

Composition D, containing the derris resins and dibenzyl-disulphide gave a 69.5 per cent control of red spiders. A check determination in which no spray was applied to the rose foliage showed that an average of 4 per cent of the spiders died from natural causes over the two day period elapsing between the time of application and the mortality counts on the sprayed insects. In the amounts employed Composition D caused no injury to violet, bean, and rose foliage.

Composition A, in which both derris resins and activator were omitted, gave a control in two days of 31.2 per cent of the spiders. Composition B, in which derris resins were employed in the absence of the activator, gave a control of 57.2 per cent. The addition of derris resins, therefore, resulted in an increase in toxicity of 26 per cent. Composition C, in which the derris resins were omitted, gave a control of 37.6 per cent. An increase of 6.4 per cent, therefore, was attributable to the presence of dibenzyl-disulphide in the spray material.

EXAMPLE 2

A mixture of derris resins and dibenzyl-disulphine as described in Example 1 may be dissolved in an excess of ethylene chloride and used to impregnate diatomaceous earth. The mixture is then warmed to drive off the solvent and obtain a dust composition adapted to be employed for the control of pea aphis and other insect pests infesting truck garden crops. In a similar manner other solid carriers may be employed with the toxicant mixture to form dusting compositions. The following are representative of such products:

Composition E

| | Parts by weight |
|---|---|
| Derris resins | 0.313 |
| Dibenzyl-disulphide | 0.187 |
| Diatomaceous earth | 99.5 |
| | 100.00 |

Composition F

| | Parts by weight |
|---|---|
| Derris resins | 0.208 |
| Dibenzyl-disulphide | 0.125 |
| Petroleum oil | 1.667 |
| Walnut shell flour | 98. |
| | 100.000 |

Composition G

| | Parts by weight |
|---|---|
| Derris resins | 0.416 |
| Dibenzyl-disulphide | 0.250 |
| Finely divided sulphur | 1.0 |
| Talc | 98.334 |
| | 100.000 |

Composition H

| | Parts by weight |
|---|---|
| Derris resins | 0.208 |
| Dibenzyl-disulphide | 0.125 |
| Pyrethrins | 0.2 |
| Diatomaceous earth | 99.467 |
| | 100.000 |

The foregoing compositions are adapted to be employed as dusts or dispersed in water and employed as sprays for the control of a wide variety of insects.

EXAMPLE 3

Insecticidal compositions comprising the nuclearly substituted derivatives of dibenzyl-disulphide may also be prepared substantially as described in the foregoing examples. The following compositions are representative:

Composition I

| | Grams |
|---|---|
| Coconut oil | 52.5 |
| Rape seed oil | 52.5 |
| Ethylene chloride | 20 |
| Tri-ethanol-amine | 36 |
| Derris resins | 7.5 |
| 4.4'-dichloro-dibenzyl-disulphide | 4.5 |

At dilutions of 1 to 400 with water, this concentrate forms a spray adapted to be employed for control of aphis on cucumber and potato vines.

Composition J

| | Grams |
|---|---|
| Petroleum oil | 105. |
| Anisole | 20. |
| Glyceryl oleate | 36. |
| Derris resins | 7.5 |
| 4.4'-dibromo-dibenzyl-disulphide | 4.5 |

This concentrate, at a dilution of 1 to 1000 with water, forms a spray which is adapted to be employed for the control of red spiders and mites on beans.

Composition K

| | Parts by weight |
|---|---|
| Derris resins | 2.08 |
| 2.2'-dimethyl-dibenzyl-disulphide | 2.125 |
| Finely divided sulphur | 20. |
| Sodium lauryl sulphate | 20. |
| Talc | 55.795 |

This dust composition may be dispersed in water at from 3 to 10 pounds per 100 gallons to form a fungicidal and insecticidal spray adapted to be applied to fruit trees for pest control.

Composition L

| | Parts by weight |
|---|---|
| Derris resins | 0.416 |
| 4.4'-dimethoxy-dibenzyl-disulphide | 0.250 |
| Pine oil | 10. |
| Glyceryl oleate | 89.334 |

This concentrate may be employed to supplement standard agricultural petroleum oil emulsions employed as summer spray.

Composition M

| | Parts by weight |
|---|---|
| Derris resins | 0.1 |
| Pyrethrins | 0.025 |
| 4.4'-dimethyl-dibenzyl-disulphide | 0.5 |
| Methyl-ethyl ketone | 10. |

When diluted with from 50 to 100 parts by weight of light petroleum distillate, this concentrate forms a spray adapted to be employed for the control of moths, flies, mosquitoes, and roaches.

While the foregoing examples are concerned primarily with mixtures of rotenone products with dibenzyl-disulphide compounds, other insecticidal materials may be included in such mixtures if desired, provided only that the activated rotenone mixture be compatible therewith. Representative of supplementary toxicants which may be employed are organic thiocyanates, cresylic acid, copper oxides, bordeau mixture, acid lead arsenate, phenthiazine, phenothioxin, and chloronaphthalenes.

Among the solubilizing agents and wetting and dispersing agents which may be substituted for those shown in the examples are n-octyl alcohol, beta(2.4.6 - trichloro-phenoxy-)beta'-chloro-diethyl ether, liquid polychloro-pentanes, safrol, toluene, xylene, ortho-dichloro-benzene, sodium oleate, sodium mono-butyl-phenylphenol-sulphonic acid, and oleic acid.

Other oils which may be used to supplement or replace those shown in certain of the examples include tall oil, corn oil, soya bean oil, olive oil, peanut oil, and menhaden oil.

The compositions with which the present invention are concerned may also be employed for the control of the Mexican bean beetle, Colorado potato beetle, cabbage worm, rose chafer, young mealy bug, and the eggs thereof.

I claim:

1. An insecticidal composition comprising a substance selected from the group consisting of rotenone and rotenone-containing derris-type resins in combination with a material selected from the class consisting of dibenzyl-disulphide and aryl, alkyl, alkoxy, cycloalkyl, chloro, and bromo nuclearly substituted derivatives thereof, in amount sufficient to serve as an activator for the rotenone product.

2. An insecticidal composition comprising a non-corrosive organic solvent and dissolved therein a substance selected from the group consisting of rotenone and rotenone-containing derris-type resins in combination with a material selected from the class consisting of dibenzyl-disulphide and aryl, alkyl, alkoxy, cycloalkyl, chloro, and bromo nuclearly substituted derivatives thereof, in amount sufficient to serve as an activator for the rotenone product.

3. An insecticide concentrate comprising an oil, a substance selected from the group consisting of rotenone and rotenone-containing derris-type resins, a solubilizing agent for the rotenone product, and a material selected from the class consisting of dibenzyl-disulphide and aryl, alkyl, alkoxy, cycloalkyl, chloro, and bromo nuclearly substituted derivatives thereof, in amount sufficient to serve as an activator for the rotenone product.

4. An insecticidal spray comprising a water dispersion of an oil having dissolved therein a toxicant mixture comprising a substance selected from the group consisting of rotenone and rotenone-containing derris-type resins in combination with a material selected from the group consisting of dibenzyl-disulphide and aryl, alkyl, alkoxy, cycloalkyl, chloro, and bromo nuclearly substituted derivatives thereof, in amount sufficient to serve as an activator for the rotenone product.

5. An insecticidal composition comprising 1 part by weight of a substance selected from the group consisting of rotenone and rotenone-containing derris-type resins in combination with from 1 to 16 parts by weight of a material selected from the class consisting of dibenzyl-disulphide and aryl, alkyl, alkoxy, cycloalkyl, chloro, and bromo nuclearly substituted derivatives thereof.

6. An insecticidal composition comprising a substance selected from the group consisting of rotenone and rotenone-containing derris-type resins in combination with sufficient dibenzyl-disulphide to serve as an activator for the rotenone.

7. An insecticidal composition comprising rotenone-containing derris-type resins and sufficient dibenzyl-disulphide to serve as an activator thereof.

8. An insecticidal composition comprising a non-corrosive organic solvent and dissolved therein a rotenone-containing derris-type resin in combination with sufficient dibenzyl-disulphide to serve as an activator therefor.

9. An insecticide concentrate comprising an oil, a rotenone-containing derris-type resin, a solubilizing agent for the rotenone product, and sufficient dibenzyl-disulphide to serve as an activator therefor.

10. An insecticidal spray comprising a water dispersion of a toxicant mixture comprising rotenone-containing derris-type resins and sufficient dibenzyl-disulphide to serve as an activator for the resins.

11. An aqueous insecticidal emulsion suitable for application to living plants, comprising a vegetable oil and dissolved therein a rotenone-containing derris-type resin and sufficient dibenzyl-disulphide to serve as an activator for the resin.

12. An insecticidal composition comprising 1 part by weight of a rotenone-containing derris-type resin and from 1 to 16 parts by weight of dibenzyl-disulphide.

13. An insecticide concentrate comprising a vegetable oil, 1 part by weight of rotenone, a solubilizing agent for the rotenone, and from 2 to 5 parts by weight of dibenzyl-disulphide per part of rotenone employed.

ROBERT J. GEARY.